April 29, 1958     W. DIENERSBERGER     2,832,150
CALIPER INDICATOR COMBINATIONS
Filed Nov. 3, 1955
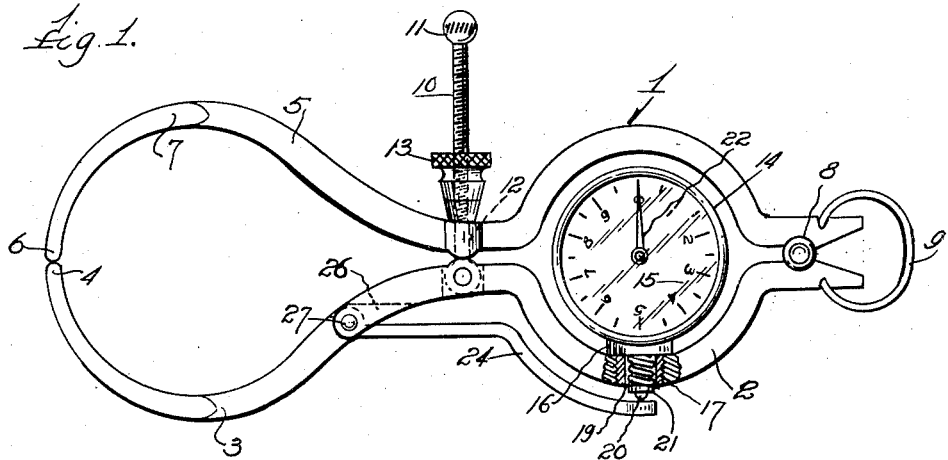
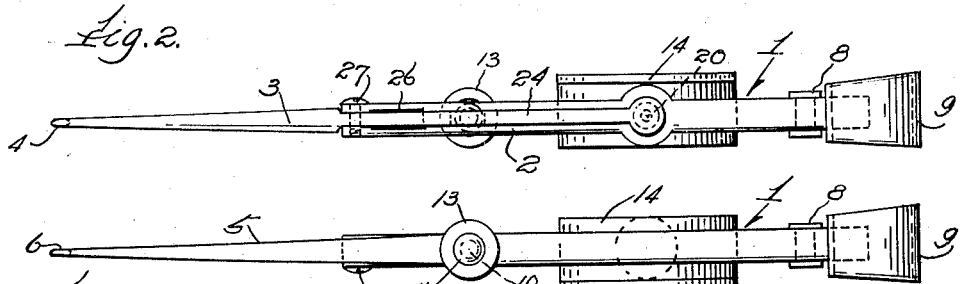
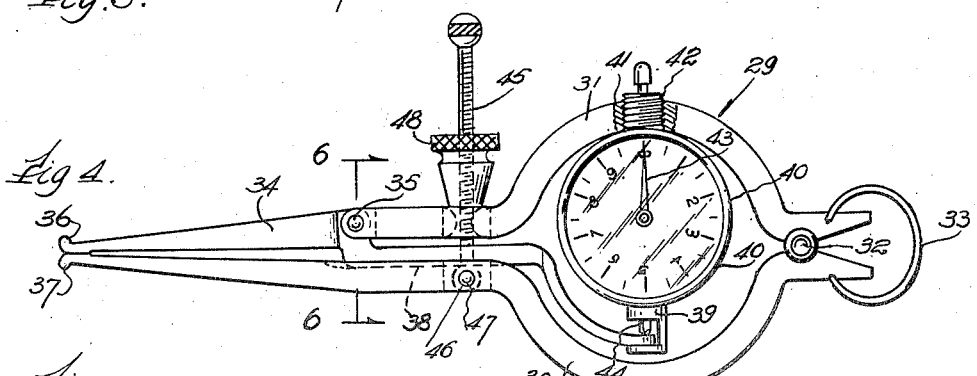
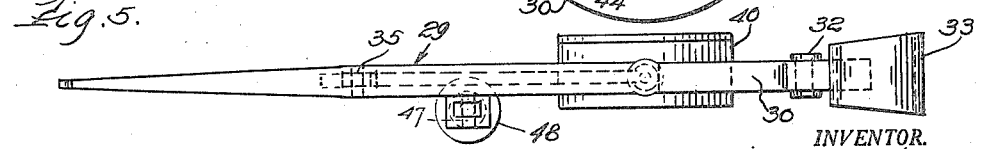
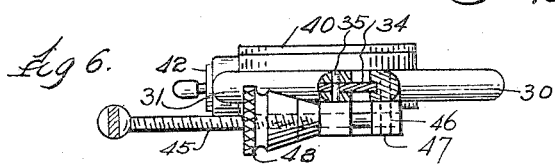
INVENTOR.
William Dienersberger.
BY
H.J. Sanders
Attorney.

United States Patent Office 2,832,150
Patented Apr. 29, 1958

2,832,150

CALIPER INDICATOR COMBINATIONS

William Dienersberger, Chicago, Ill.

Application November 3, 1955, Serial No. 544,639

3 Claims. (Cl. 33—148)

This invention relates to measuring instruments and more particularly to caliper indicator combinations and one of its objects is to provide an instrument for taking outside and/or inside measurements with facility, accuracy and speed of operation. A further object is to provide a caliper indicator combination of simple structure, relatively inexpensive to manufacture and compact in assembly.

Other features and objects not here enumerated will appear from the following specification describing specifically the instrument embodying this invention, defined by the claims and illustrated in the accompanying drawings forming part of this disclosure. In the drawings:

Fig. 1 is a plan or face view of one preferred form of the outside calipers in the closed position.

Fig. 2 is an edge view of Fig. 1.

Fig. 3 is a view of the opposite edge to that shown in Fig. 2.

Fig. 4 is a plan or face view of one preferred form of the inside calipers in closed position.

Fig. 5 is an edge view of Fig. 4, and,

Fig. 6 is a cross-sectional view through Fig. 4 on the line 6—6.

In carrying out the invention as herein set forth, reference is first particularly made to Figs. 1, 2 and 3 wherein the reference numeral 1 denotes a pair of outside calipers including a recessed leg 2 and a curved or bowed lower member 3 terminating in the toe 4. The companion leg 5, also formed with a toe portion 6 terminating the flat portion 7, said legs 2, 5 connected by the joint pivot 8, said toe portions urged apart by the spring ring 9 connecting same.

The spread of said legs is regulated by threaded rod 10 having the knurled head 11, the opposite end of said rod embedded in a cavity in the said leg 2, the said post extending through the perforation 12 in leg 5, said rod 10 having mounted thereon the adjusting nut 13. Arranged between said legs 2, 5 is the circular indicator case 14, one face of said case forming the inches dial 15, said case operatively supported upon the anchor 16 carried by leg 2, said leg 2 having a threaded tubular member 17 through which a spring 19 extends that carries a pin 20 provided with a collar 21, said pin connected to the dial indicator 22, said pin 20 operatively engaging dial indicator hand 22, said spring 19 yieldingly urging pin 20 outwardly into frictional engagement with the outer arm 24 received at one end in the leg recess 26 upon pin 27. With the calipers in closed position, shown in Fig. 1, the spring tension is sufficient to keep the indicator 22 exactly upon zero. However, when the toes 4, 6 are applied to the outer surface of the object to be measured, in conventional manner, the pressure upon the pin 27 is increased by leg 5, through arm 24 and the indicator hand is moved about the face of the dial 15 registering in inches and fractions thereof the diameter of the object being measured.

Referring to Figs. 4 through 6, a pair of inside calipers 29 is shown including legs 30, 31 connected at one end by the joint pivot 32, said legs being urged apart by the spring ring 33. The leg 31 is a short leg forked at its lower end to receive the angular outside arm 34 to which it is connected pivotally by the pin 35, said arm terminating at one end in the toe 36, said leg 30 terminating in the companion toe 37, said toes outwardly disposed with respect to each other for inside caliper measurements.

That portion of arm 34 immediately above pivot 35 is offset and operably received in a recessed portion 38 of leg 30, said arm terminating at its upper end in an arcuate portion received in a keeper 39 carried by the inches dial 40 operatively secured in a perforate portion 41 of the leg 31 by anchor 42, the indicator hand 43 of said dial operatively connected to the spring-pressed pin 44 supported in said keeper 39 and engaging the said arm 34 yieldingly retaining hand 43 exactly at zero in the closed position of the calipers shown in Fig. 4.

The spread of the caliper legs is regulated by threaded rod 45 passing through and operatively engaging the leg 31 and terminating in a perforate portion of leg 30 and secured in position by pivot 47 connecting it to said leg. Mounted upon said rod 45 is the adjusting nut 48. In operation the arm 34 and leg 30 have their toe portions 36, 37 inserted into the hollow tube, pipe or the like to be measured and the adjusting screw moved to spread said members apart until said toes contact the inner periphery of the object measured, this movement causing the upper end of arm 34 to depress the spring-pressed pin 44 and actuate the hand indicator 43 about the dial to such point thereon as will indicate the measurement in inches and fractions thereof.

What is claimed is:

1. A pair of inside calipers comprising a one-piece lower leg and a two-piece upper leg hinged adjacent their rear ends by a joint pivot, said legs terminating at the forward ends thereof with toes outwardly disposed wtih respect to each other, spring means in contact with the rear ends of said legs to urge their forward toed ends apart, the rear end portion of said two-piece upper leg having a bifurcated terminal at its forward end, the forward end portion of said two piece upper leg composed of an angular shaped arm pivotally secured intermediate its ends to said bifurcated terminal of said rear end portion, a circular graduated dial having a circular case secured at its upper portion to said rear end portion of said two-piece upper leg, said dial having an indicator registering with said graduated dial, a keeper carried by said case, a spring pressed pin in said keeper operatively connected at its upper end to said indicator, the rear terminal end of said angular arm operatively engaging the lower end of said pin, said case, said keeper, and the rear end portion of said angular arm substantially disposed wholly within the space between the rear ends of said legs, the common vertical plane passing through said case, said keeper, and said upper and lower legs, a portion of said angular arm operatively disposed in a recessed portion in the upper surface of said lower leg, a threaded rod pivotally secured at its lower end to said lower leg, said rod passing through a vertical bore in said upper leg, and an adjusting nut assembled upon said threaded rod operatively engaging the upper surface of said upper leg.

2. A pair of inside calipers comprising a one-piece leg and a two-piece leg hinged adjacent their rear ends by a joint pivot, said legs terminating at the forward ends thereof with toes outwardly disposed with respect to each other, spring means in contact with the rear ends of said legs to urge their forward toed ends apart, the rear end portion of said two-piece leg having a bifurcated terminal end at its forward end, the forward end portion of said two-piece leg composed of an angular shaped arm pivotally secured intermediate its ends to said bifurcated terminal of said rear end portion of said two-piece leg, a circular graduated dial having a circular case, said case secured to said rear end portion of said two-piece leg, said dial having an indicator registering with the graduations on said graduated dial, a keeper carried by said case, a spring pressed pin in said keeper operatively connected to said indicator, the rear terminal end of said angular arm operatively engaging said pin, said case, said keeper, and the rear end portion of said angular arm substantially disposed wholly within the space between the rear ends of said legs, the common plane embodying said dial and said case passing through said keeper and said legs, a threaded rod pivotally secured at its one end to said one-piece leg, said rod passing through a bore in the rear end portion of said two-piece leg, an adjusting nut assembled upon said threaded rod operatively engaging the outer surface of said rear end portion of said two-piece leg.

3. A pair of inside calipers comprising a one-piece leg and a two-piece leg hinged adjacent their rear ends by a joint pivot said legs having curved portions ahead of said joint pivot and disposed outwardly with respect to each other forming a circular opening, said legs terminating at the forward ends thereof with toes outwardly disposed with respect to each other, spring means in contact with the rear ends of said legs to urge their forward toed ends apart, the rear end portion of said two-piece leg having a bifurcated terminal end at its forward end, the forward end portion of said two-piece leg composed of an angular shaped arm pivotally secured intermediate its ends to said bifurcated terminal of said rear end portion of said two-piece leg, a circular graduated dial having a circular case, said case secured to the curved portion of said rear end portion of said two-piece leg, said dial having an indicator registering with the graduations on said graduated dial, a keeper carried by said case, a spring pressed pin in said keeper operatively connected to said indicator, the rear terminal end of said angular arm operatively engaging said pin, said case, said keeper, and the rear end portion of said angular arm substantially disposed wholly within the circular opening between the curved portions of the rear ends of said legs, the common plane embodying said dial and said case passing through said keeper and said legs, a threaded rod pivotally secured at its one end to said one-piece leg, said rod passing through a bore in the rear end portion of said two-piece leg, an adjusting nut assembled upon said threaded rod operatively engaging the outer surface of said rear end portion of said two-piece leg.

References Cited in the file of this patent

UNITED STATES PATENTS

| | | |
|---|---|---|
| 1,166,868 | Tong | Jan. 4, 1916 |
| 1,324,870 | Zito | Dec. 16, 1919 |
| 2,468,362 | Fournier | Apr. 26, 1949 |
| 2,514,024 | Bernard | July 4, 1950 |